United States Patent [19]

Aronson

[11] 3,928,080

[45] Dec. 23, 1975

[54] PANCAKE BATTERY

[75] Inventor: Robert R. Aronson, Ferndale, Mich.

[73] Assignee: Electric Fuel Propulsion Incorporated, Troy, Mich.

[22] Filed: Aug. 3, 1973

[21] Appl. No.: 385,324

Related U.S. Application Data

[63] Continuation of Ser. No. 26,218, April 7, 1970, abandoned.

[52] U.S. Cl. .................................................. 136/160
[51] Int. Cl.² ............................................. H01M 2/38
[58] Field of Search .......................... 136/159–162, 136/100, 6, 13, 14

[56] References Cited
UNITED STATES PATENTS

| | | | |
|---|---|---|---|
| 916,320 | 3/1909 | Joel...................................... | 136/159 |
| 2,584,117 | 2/1952 | Elrod, Jr............................... | 136/159 |
| 3,040,116 | 6/1962 | Gauvin................................. | 136/160 |
| 3,166,447 | 1/1965 | Bronstert et al. ................. | 136/160 X |
| 3,247,024 | 4/1966 | Pamminen ......................... | 136/160 X |
| 3,359,136 | 12/1967 | Merten et al. ..................... | 136/6 |
| 3,532,545 | 10/1970 | Babusci et al. .................... | 136/13 X |

Primary Examiner—John H. Mack
Assistant Examiner—C. F. Lefevour
Attorney, Agent, or Firm—Cushman, Darby & Cushman

[57] ABSTRACT

A battery preferably for use as a power source in an electrical vehicle in which the batteries can be disposed across the bottom of the car to form a structural part of the vehicle. Each cell is preferably divided into three chambers — an upper chamber, a middle chamber containing the horizontally mounted battery plates and a lower chamber — so that the electrolyte flows by gravity from the upper chamber through the plates flushing waste products such as water which result from the production of electricity by the battery and which eventually insulate the electrolyte from the plates and prevent further electricity from being produced. After all of the electrolyte has flowed from the upper chamber into the lower two chambers, it can be pumped back to the upper chamber to repeat the journey, either while the vehicle is stopped, by applying a source of compressed air to the lower chamber, or continuously while the vehicle is moving, for example, by pumping the liquid during regenerative braking. The plates can be of any shape or size including circular, and preferably the horizontal plates are disposed at a slight angle to prevent gas produced during charging from building up between the plates. In another embodiment the plates are formed as cones and disposed in a stack in the battery so that the electrolyte flows downward through the cones.

6 Claims, 9 Drawing Figures

INVENTOR
ROBERT ARONSON

BY
Cushman, Darby & Cushman
ATTORNEYS

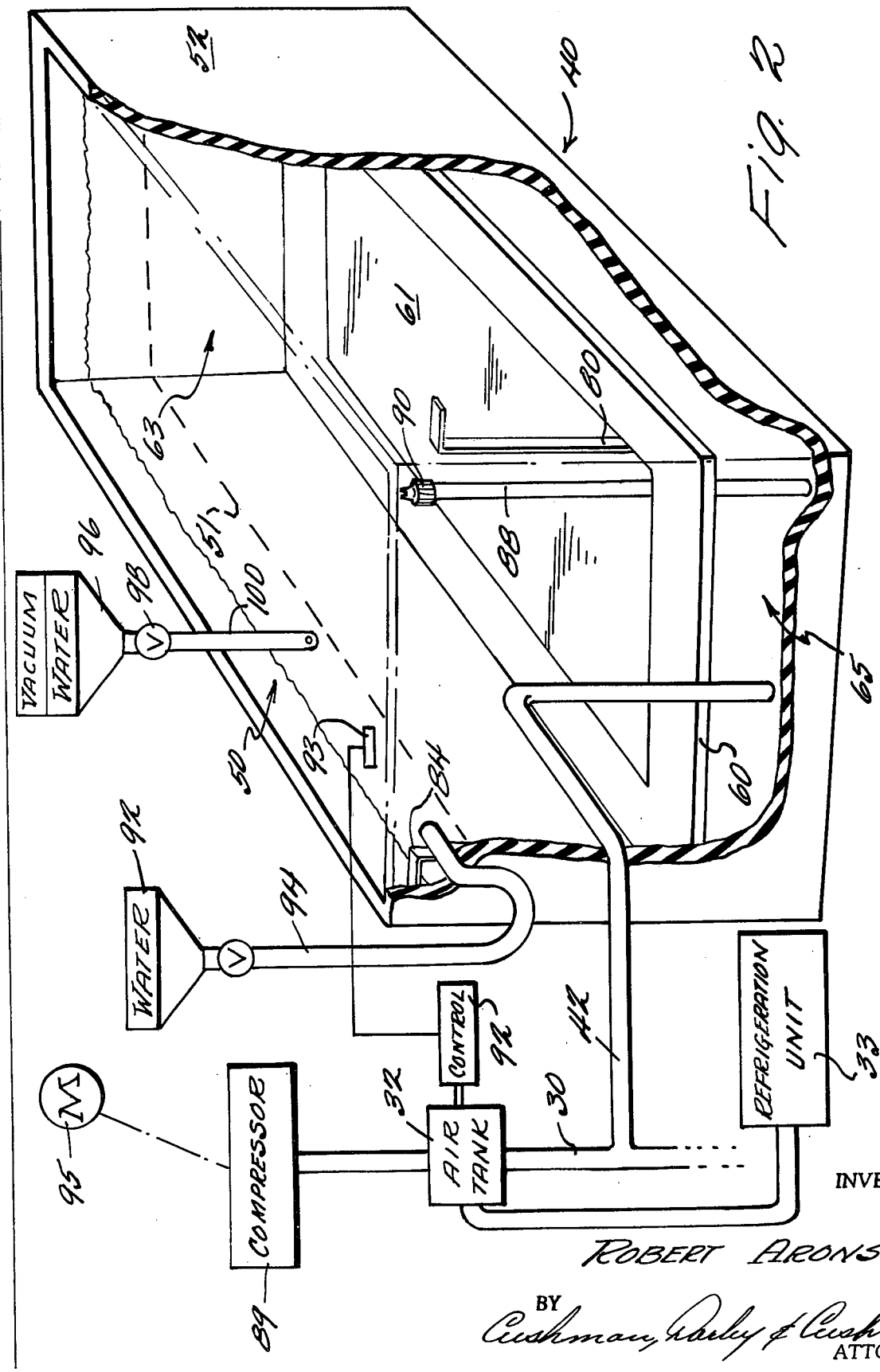

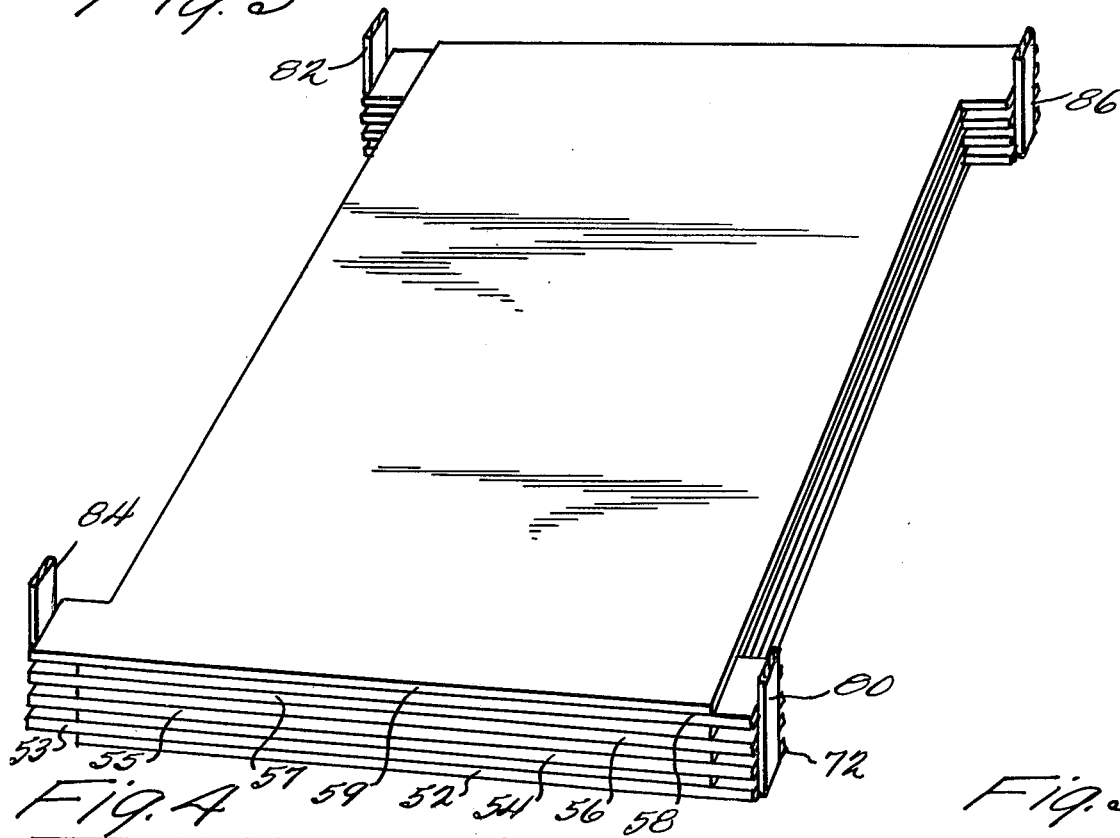
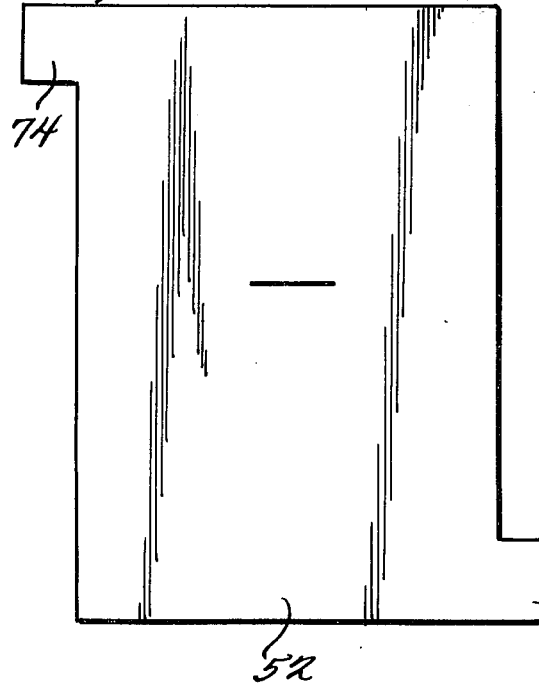
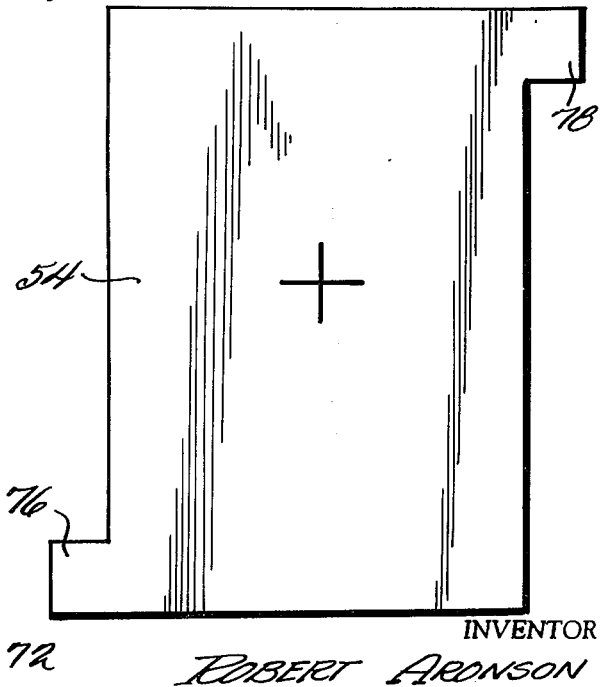

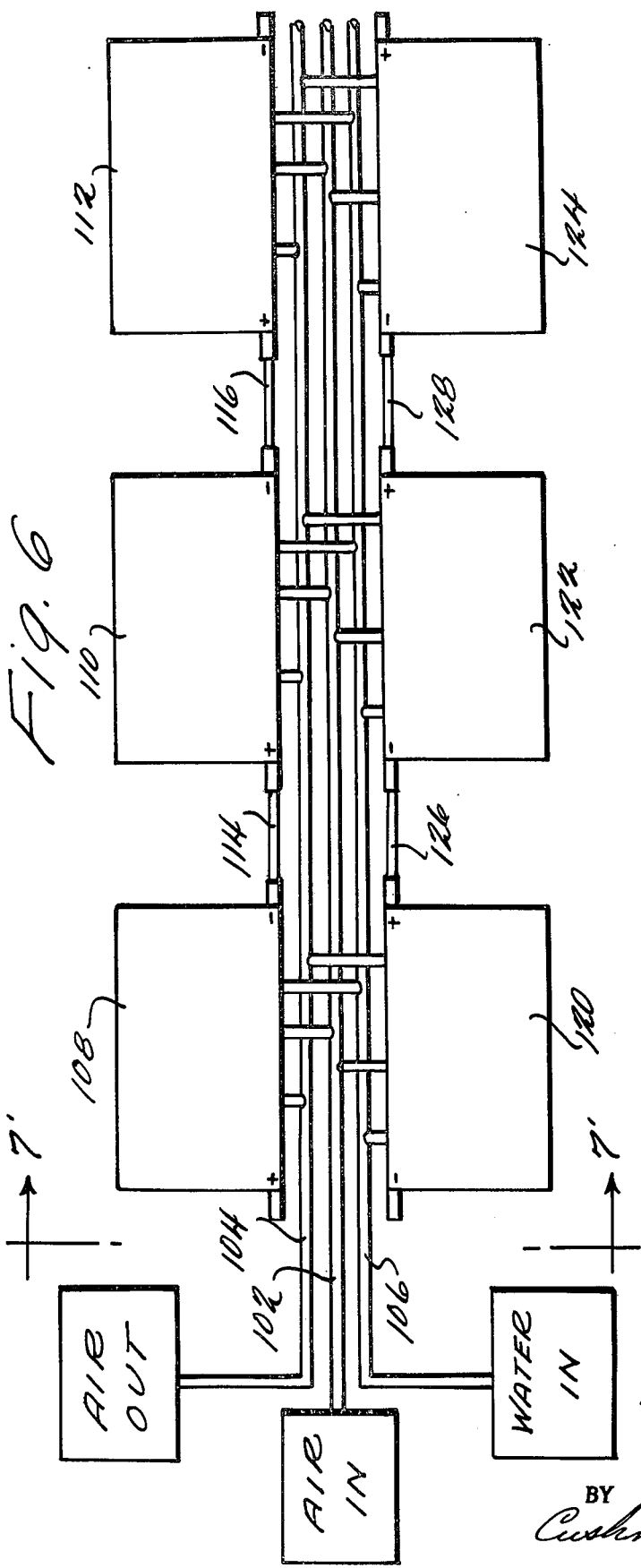
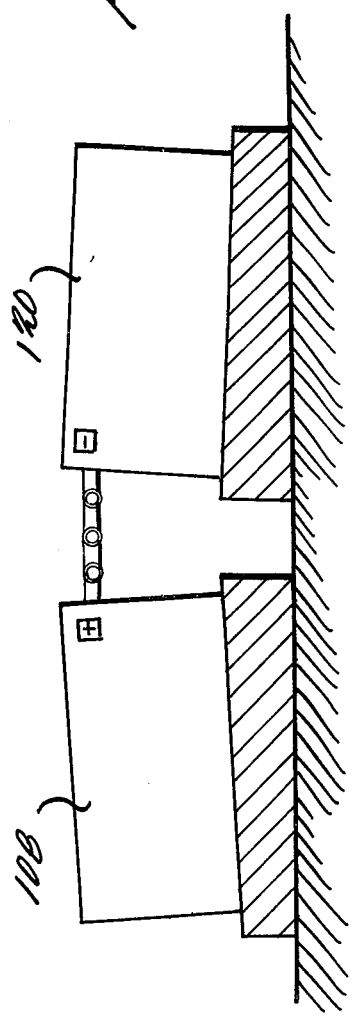

PANCAKE BATTERY

This is a continuation of application Ser. No. 26,218 filed Apr. 7, 1970, now abandoned.

BRIEF DESCRIPTION OF THE PRIOR ART AND SUMMARY OF THE INVENTION

The invention relates to a novel battery.

At the beginning of the 20th century, electricity, steam and combustible fluids such as gasoline were the three potential sources of energy for automobiles. For many reasons, including the failure of the advocates of steam and electricity to produce power sources which were capable of driving an automobile reliably at high speeds and over reasonable distances and which were capable of being quickly replenished, gasoline driven, internal combustion engines soon eclipsed all other power sources and a major portion of the time and energy of the automobile industry since that time have been spent in improving that complex and unwieldy device, the internal combustion engine.

Recently, it has become increasingly apparent that the gasoline driven automobile, despite its contribution to technology and culture, has also provided a number of extraordinarily difficult problems which are not susceptible to simple solutions. Among these problems, is the thermal, noise and atmospheric pollution which results from the use of gasoline driven automobiles. Such pollutants are the necessary by-product of the combustion of gasoline and cannot ever be entirely eliminated. Moreover, it is becoming increasingly apparent that oil supplies in the world are limited, and must to an extent be conserved.

As a result, the electrically powered automobile, which was bypassed as a practical vehicle many decades ago, has been increasingly considered as a feasible alternative to the gasoline driven automobile, and as a solution to many of the problems generated by such automobiles. Since an electrical automobile powered by batteries does not require burning a fluid, no heat or combustion by-products are produced and moreover, electrical vehicles can be operated extremely quietly and efficiently. Further, while energy is, of course, required to move the electrical vehicle, just as it is required to move the gasoline driven vehicle, and energy is also required to generate the electricity, that original generating energy can be derived from sources which do not need to be conserved as do oil supplies. Generation of electricity from solar and nuclear plants, as well as hydroelectrical plants, can provide usable energy, without at the same time decreasing our limited and irreplaceable oil resources.

Unfortunately, there was in the years in which the gasoline engine was being developed no corresponding emphasis on developing an electrically powered vehicle and particularly on developing a reliable source of electricity which would be sufficiently compact to replace a gasoline engine and at the same time contain sufficient energy and be rechargeable quickly enough to be competitive with gasoline engines. Conventional lead acid batteries, which have been used to supply energy to initiate combustion in gasoline engines and to provide electricity for various other functions in automobiles, are not substantially different from similar batteries used at the beginning of the 20th century. Since only a small electrical capacity is required in gasoline driven vehicles, there is no particular necessity either to minimize battery weight and size or to maximize efficiency in using the electrical energy produced. However, when such a battery or batteries must alone supply all the energy needed to move a vehicle along the surface of the earth, then the problems of battery weight, size and efficiency assume the greatest import.

One of the major problems in all batteries having an electrolyte surrounding metallic plates is that during the chemical reaction which accompanies the production of electricity the waste products of the reaction tend to concentrate around the plates and insulate the electrolyte from the plates. If the energy production is slow enough, such waste products, of course, eventually diffuse throughout the electrolyte, and energy production continues until the waste concentration exceeds a given level or the reactants are totally consumed. However, when the battery is discharging at a high rate, these waste products, which usually include water, accumulate around the anode and eventually insulate the anode plates from the electrolyte at which time the battery ceases to produce electricity even though it is not fully discharged. Thus, for example, an electrical car of conventional type and with conventional batteries can be driven for 120 miles at 30 miles an hour, but only 60 miles at 60 miles an hour. Of course, after this 60-mile distance, if the water is given a chance to diffuse through the electrolyte, the vehicle can then be driven for a short distance before the waste products again clog the plates and reduce the current generating capability of the battery.

This invention solves this difficult problem by continually flushing the waste products away from the battery plates. This is accomplished in one embodiment discussed below by disposing the battery plates horizontally in the middle chamber of a three-chamber cell with the electrolyte initially pumped into the upper and middle chambers and thereafter diffusing continuously through the plates, washing the waste products along with it, until all of the battery electrolyte has moved by gravity into the lower and middle chambers. At that time, the vehicle can be stopped and the electrolyte pumped back to the upper chamber, for example, by a compressed air source. The plates remain covered at all times. Alternatively, the electrolyte may be continuously repumped to the upper chamber by a pump operated by the vehicle or by a pump operated only during regenerative braking or other energy recovery.

Since charging the battery, and particularly rapid charging such as is desired with an electrical car, often causes the generation of gases which should be permitted to escape, the horizontal battery plates are preferably tilted slightly at an angle to the horizontal to prevent gases from building up between the plates and causing warping or other undesirable effects. Cooling the battery with a blower or a refrigeration unit may also speed recharging. Even further, tubes are preferably connected to the upper chamber of each cell to permit additional electrolyte to be added and to permit any excess pressure, for example, from escaping gases, to be vented to the atmosphere, preferably through a water filled tank.

In another similar embodiment the plates are formed of expanded metal and in a conical shape. The plates are stacked one inside the other with their open ends facing upward so that electrolyte flows through each of the plates in turn, flushing away waste products, and is then pumped up into the top plate. The pumping may be accomplished by an air source bubbling air into a narrow tube open at the bottom so that the electrolyte is continually conveyed upwards into the top conical plate.

Also, in order to utilize the limited space available in an automobile efficiently and to minimize the automobile weight, it is contemplated that this novel battery may form part of the structure of the car, for example, the floor.

Other purposes and objects of the invention will become clear from the following detailed description of the drawings.

BRIEF DESCRIPTION OF THE DRAWINGS

FIG. 2 shows a cutaway side view of one of the batteries shown in FIG. 1 with the plates removed.

FIG. 3 shows a stack of plates for the battery of FIG. 2.

FIG. 4 shows a negative plate from the stack of FIG. 3.

FIG. 5 shows a positive plate from the stack of FIG. 3.

FIG. 6 shows a string of interconnected batteries.

FIG. 7 shows a sectional view of the batteries of FIG. 6 along the line 7—7'.

DETAILED DESCRIPTION OF THE DRAWINGS

Figure 1:
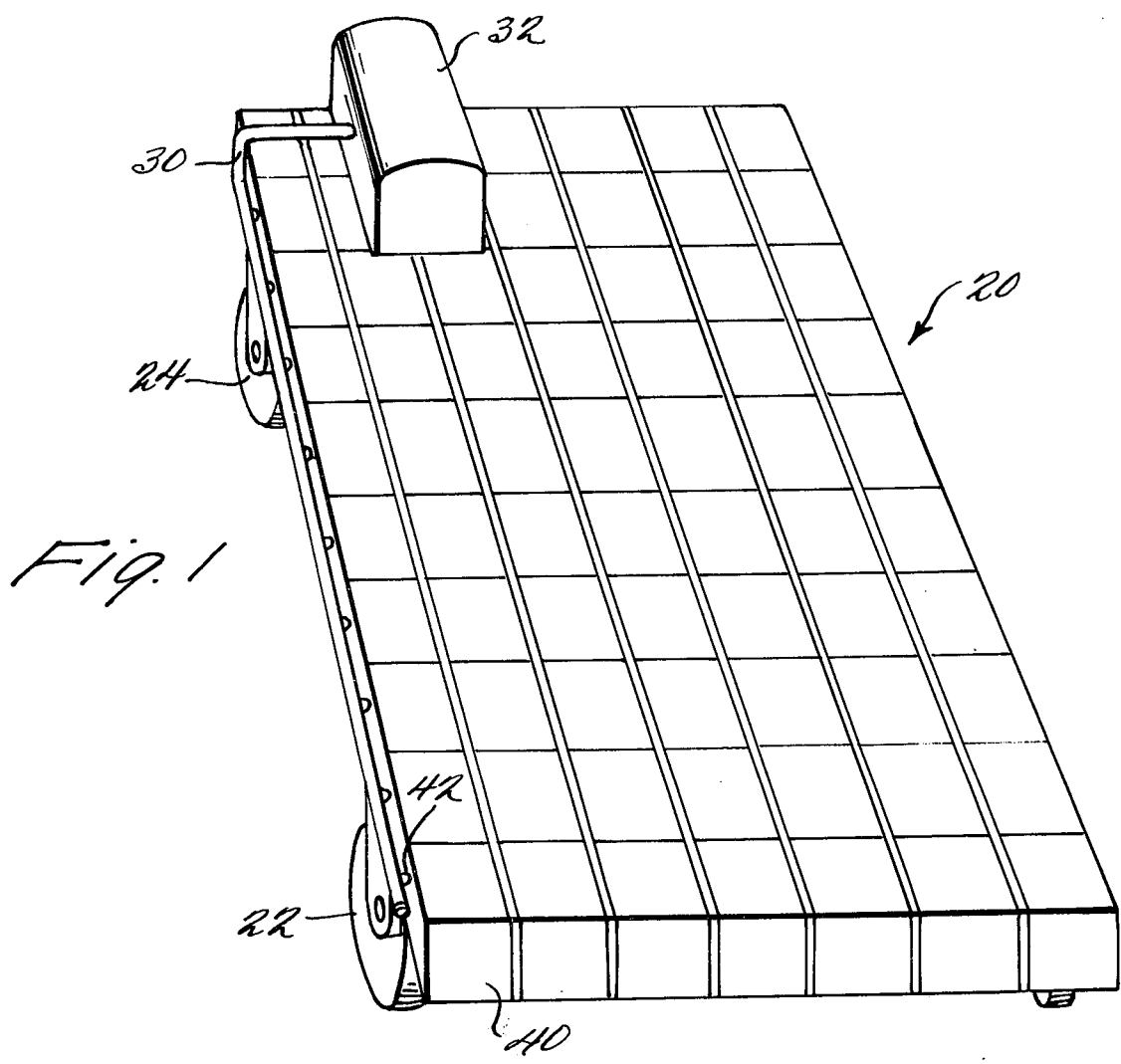
FIG. 1 shows a cutaway view of a vehicle with a plurality of batteries constructed according to this invention providing electrical power to drive the vehicles and provide structural support for the vehicle.

Reference is now made to FIG. 1 which shows an electrical vehicle which employs batteries of this invention and which has its top portion removed so that the plurality of batteries which provide electrical energy to drive the vehicle, as well as structural support, can be seen. In this embodiment, all of the battery cells, which together form a source 20, are in reality the bottom or floor of the vehicle and replace a sheet of steel or other material which would ordinarily be present. As with a conventional floor, the batteries which make up source 20 can be molded and formed in any desirable fashion, for example, to create a well for the wheels such as wheels 22 and 24 or can provide a substantially flat surface.

In the embodiment of FIG. 1, 60 separate battery cells disposed in separated rows of ten are employed, and it is contemplated that all of the batteries in each row will be connected in parallel and the rows themselves will be connected in series. However, it may be desirable to be able to change the interconnection of the various battery cells and rows in order to produce a plurality of voltage levels. For example, it may be desirable to provide one level of voltage when starting the vehicle, another level when moving at 30 miles an hour, and yet another level when cruising at 60 miles an hour. This can be simply accomplished by using conventional control devices to connect the battery cells which together comprise the source 20 in different parallel and serial arrangements. Even further, it is contemplated that a tube or pipe such as tube 30 will emanate from tank 32 for each row as discussed below and will supply air under pressure to each row with separate intake tubes linking each main tube to each individual battery. For example, cell 40 which is shown in detail in FIGS. 2 and 3 is linked to tube 30 by intake tube 42. Even further, as discussed below, another tube for permitting excess air pressure and gases to be vented to the atmosphere and a tube for supplying water or other replacement compositions are also preferably provided for each row or group of batteries as can be seen in FIG. 6.

As discussed above, one of the great problems facing the emerging electrical car industry is mounting the portable electrical energy sources, in this embodiment the batteries comprising source 20, in such a fashion so as to leave sufficient room for passengers and luggage, while at the same time including enough energy storage to provide a substantial cruising distance between rechargings. Disposing the batteries as the structural bottom of a vehicle as shown in FIG. 1 can greatly alleviate this problem. Even further, since it is contemplated that the plates which are mounted in each of the single cell batteries in the source 20, for example, battery 40, will be disposed roughly horizontally with an upper chamber above the plates and a lower one below it, the batteries, such as battery 40, can be small in height, and in fact it is contemplated that each battery will be only roughly 7 inches or so high. With this novel arrangement it is quite possible to build a car which has about 5 inches of clearance, a normal distance for modern cars which travel smooth highways, and is at the same time low slung, attractive, and extremely maneuverable. The batteries and plates can also be made in any convenient shape. For example, round batteries and plates are feasible.

Reference is now made to FIG. 2 which shows a cutaway view of a typical battery 40 with its plates removed and to FIG. 3 which shows a stack of plates for the battery 40. While it is not necessary to this invention that any particular type of plates or electrolyte be used, it is contemplated that lead cobalt plates will be preferably employed. As discussed above, one of the great problems with conventional electrolyte-plate secondary batteries is that during discharge waste products such as water form around the plates, and gradually diffuse throughout the electrolyte. If formed quickly enough because of a large energy demand on the battery, such waste products become concentrated around the plates and effectively insulate the plates from the electrolyte until in time they diffuse throughout the electrolyte. However, this insulation in effect prevents further chemical reaction within the battery and resultant production of electrical power for the interim.

With a lead cobalt battery, the waste product is primarily water and the porous plates which are conventionally used hold this water like a sponge so that, as the water accumulates, the capacity of the battery decreases. When the concentration of water in and around the plates reaches a certain level, the battery is apparently dead. However, if the battery is simply left alone for a few hours, it displays a bounce-back capability which results from the uniform diffusion of the water throughout the electrolyte and is again capable of producing electrical power. Thus, it has been found that an electrical car operating normally at 120 volts on conventional 300 ampere-hour batteries can be driven 60–70 miles at 60 miles an hour before the current output of the batteries drops rapidly to zero. If the batteries are left to their own devices for a half-hour or so, the car can then be driven an additional 6 to 7 miles. After a wait of 2 more hours, a trip of five more miles can be taken. However, if the car is driven at 30 miles an hour with consequently less power demand and a lower rate of discharge, then that same car can be driven roughly 120 miles without stopping. Accordingly, the advantages of this invention which permit energy to be discharged at any chosen rate without reducing the distance which a vehicle can travel between recharging is important especially since high discharge rates are frequently desirable and necessary in electrical vehicles.

This invention solves the problem of waste build-up around the plates by continuously flushing the electrolyte through the plates to carry away the waste products as they are produced, and thus assist the slow diffusion of such waste products throughout the electrolyte. In the embodiment shown in the drawings, such flushing is accomplished by pumping all of the electrolyte into an upper chamber 50 which is simply the area between the top of the stack of plates shown in FIG. 3 and the top of the battery case 52, which is preferably made of polyethylene or similar material in a one-piece molded construction. The top of the stack of plates is represented in FIG. 2 by a dashed line 51 along two sides of the case. From this upper chamber 50, the electrolyte flows downward through the plates by gravity, assisted, if desired, by air pressure, slowly and continuously carrying away the waste water formed during discharge. A sealing plate 60 and a membrane 61 separate the middle chamber 63 which the stacks of plates occupy and the lower chamber 65. Membrane 61 is preferably permeable to the electrolyte but impermeable to air.

The stack of plates 52, 53, 54, 55, 56, 57, 58 and 59 is shown in FIG. 3, and these plates are normally disposed substantially horizontally within the case 51 of battery 40 and particularly within the middle chamber 63 between sealing plate 60 and the dashed lines on the case 51. Although eight plates — four negative and four positive — are illustrated in FIG. 3, it will, of course, be understood that any suitable number of plates can be employed in any given battery, depending upon the height and shape of the battery desired as well as its output capabilities. Further, it is contemplated that the amount of electrolyte in the battery will be sufficient to keep the plates in the middle chamber 63 covered at all times. Therefore, after the electrolyte has been completely pumped from the lower chamber 65 to the upper chamber 50, the middle chamber 63 and the upper chamber 50 will be almost full and after the electrolyte has filled lower chamber 65 by moving through the plates, the plates will still be completely covered.

Figure 8:
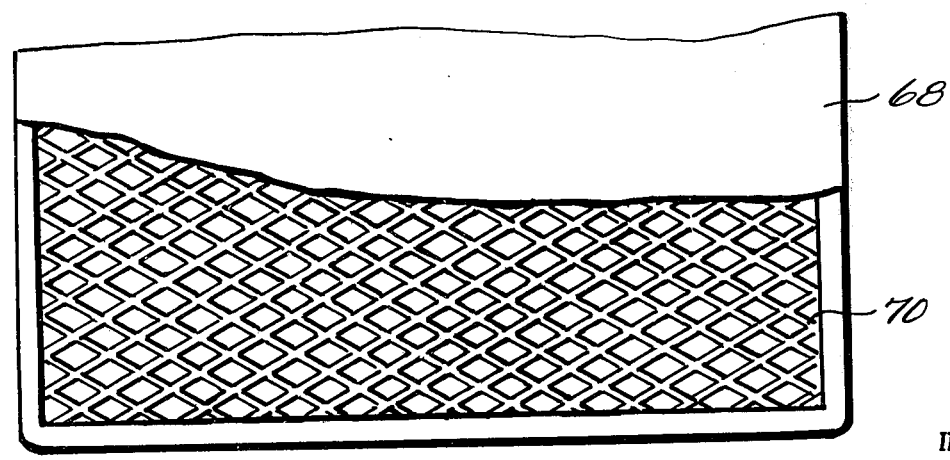
FIG. 8 shows a plate with a portion of the paste removed to bar the grid.

The plates shown in FIG. 3 are constructed conventionally by applying a paste to a lead or lead alloy grid, the plates having one kind of paste being negative and the plates having another kind being positive. As can be seen in FIG. 8, the paste 68 for either positive or negative plates is usually applied over a lead grid 70. Conventionally these grids are cast in molds and, so that they can support themselves, they are made much thicker than necessary to conduct the maximum current produced by the plate. In fact, the practical minimum thickness for grids made by casting is about 50 thousandths of an inch, which means that a plate made with such a grid is generally 60 to 125 thousandths of an inch thick.

In conventional batteries the grid has to be much thicker than necessary for conducting current because it also vertically supports the plate. By mounting the plates substantially horizontally, the necessity to vertically support the plates is eliminated. Accordingly, the use of much thinner plates, and hence more plates and more active surface area in any given volume is possible.

One way to make grids much thinner than cast grids is to use the expanded metal process. A sheet of lead of any given thickness is repeatedly cut and stretched to form a grid such as grid 70 in FIG. 8. Preferably, the thickness of this grid is about 20 thousandths of an inch ± 2 thousandth so that the pasted plate thickness is about 23 to 27 thousandths of an inch thick or about half of the minimum thickness practically possible with casting techniques. Such a plate will not stand vertically, but functions satisfactorily when mounted substantially horizontally as shown in FIG. 3.

Further, as can be seen in FIGS. 3 to 5, each of the plates are provided with lugs at two opposing corners. For example, the negative plate 52 is provided with tabs 72 and 74, and the positive plate 54 with tabs 76 and 78. When the plates are stacked as shown in FIG. 3 the adjacent positive and negative plates are separated by conventional separators or insulators. Further, the tabs of the positive plates are aligned along one of two corners of the case 51 and the tabs of the positive plates are aligned along the other two corners. Straps 80 and 82 connect the tabs of the negative plates while straps 84 and 86 connect the tabs of the positive plates, so that each plate is linked to plates of the same polarity in two places. As can be seen in FIG. 2, the strap 80 extends through the casing 51 to provide a negative exterior terminal and the strap 84 does likewise to provide an exterior positive terminal.

As mentioned briefly above, the electrolyte after it has moved under the influence of gravity and, if desired, air pressure from the upper and middle chambers of the battery 40 into the middle and lower chambers is returned to the upper and middle chambers to repeat its descent. In the embodiment of FIGS. 1 and 2, this return is accomplished by connecting a source of air 32 at a pressure above atmospheric pressure to the lower chamber 65 via lines 30 and 42. The pressurized air entering chamber 65 forces the electrolyte to rise up tube 88 and to flow into the upper and middle chambers via one way valve 90. The membrane 61 prevents air from penetrating through the stack of plates. When all of the electrolyte has been pushed out of chamber 65, the source 32 can be disconnected from line 30, line 30 opened to the atmosphere to release the pressure on bottom chamber 65 and the electrolyte permitted to repeat its downward journey through the plates. With a stack of thirteen plates about 2½ inches thick, a top chamber 2 inches high and a bottom chamber 1⅝ inches high, it was found to take about 2 hours for the electrolyte to completely fill an empty lower chamber by moving through the plates. About 2 pounds per square inch of air pressure over atmospheric pressure was required with this battery to force the electrolyte up through tube 88 into the upper chamber 50 in 2 to 5 minutes depending on the diameter of tube 88.

The electrolyte can be pumped back into the upper compartment each time that the batteries are recharged and a source of air pressure exterior to the vehicle can be used to simultaneously pump the electrolyte in all of the batteries. Alternatively, the source can be an air tank mounted in the vehicle which is supplied with air from an air compressor 89 shown in FIG. 2. The air tank can be filled from an exterior source or the air compressor can be mounted within the vehicle. If mounted in the vehicle the compressor 89 can be run directly by an electrical motor or can, as shown in FIG. 2, be operated regeneratively by the motor 95 which drives the vehicle during braking to assist in slowing the vehicle and to recover kinetic energy which would otherwise be lost. Regenerative braking is discussed more fully in an application entitled "Regenerative System for Electric Vehicle," Ser. No. 693,933, filed Dec. 26, 1967, and the disclosure of this application is explicitly incorporated herein by reference. Arrangement can be made for automatically causing the air tank 32 to pump the electrolyte whenever necessary or desirable. For example, in FIG. 2, the air tank 32 is activated by control circuitry 91 to permit air to enter the batteries when the electrolyte level in one or more of the batteries reaches a certain level as detected by conventional device 93 mounted within battery 40. Preferably, control circuitry 92 is designed to cut off the flow of air after a predetermined time has elapsed.

A certain amount of gases such as oxygen and hydrogen are always produced during charging by a plate electrode battery such as shown in FIG. 2. If the battery is overcharged, the volume of gases produced may be substantial. When the plates are mounted horizontally, these gases may be trapped between the plates and eventually warp them. Accordingly, it is desirable to prevent these gases from accumulating between the plates.

One way to accomplish this goal is to mount the batteries at a slight angle, for example, 5 to 10 degrees, so that the gases escape into the upper chamber. The batteries 108 and 120, as shown in FIG. 8, are mounted in this fashion. Mounting the batteries at a slight angle to the horizontal may be desirable for other reasons, particularly where they are to fit under the seats. Another possibility is to mount the stack of plates in the battery at a similar angle.

Another effective technique for preventing the accumulation of gases between the plates is to continue to introduce air into the lower chamber 65 after all of thee electrolyte has been pumped into the upper chamber 50. This additional air creates a pressure which pushes up on the plates from the chamber 65 and down on the plates from chamber 50. The plates are squeezed together like an accordian by these two opposing forces and the gases trapped between the plates are squeezed out. A pressure of 5 pounds per square inch above atmospheric pressure in chambers 50 and 65 has been found to be sufficient to adequately remove the gases.

The extra air added to remove the gases can be partially retained to assist in forcing the electrolyte down through the plates. However, if the pressure in the upper chamber exceeds a predetermined value, the valve 90 is activated to permit venting of the air and gases in chamber 50 to the atmosphere via water tank 92 and line 94. Like line 30, line 94 may connect to a group of batteries. Additional water from tank 96 can also be supplied to chamber 50 via valve 98 and line 100, preferably flowing by gravity. If desired, provision may be made to add water automatically as required.

FIGS. 6 and 7 show an arrangement of six batteries each connected to line 102 for supplying air to the batteries to pump the electrolyte to line 104 for venting excess air and gases from the batteries and to line 106 for adding more water or other replacement fluids to the batteries. This arrangement might, for example, be mounted beneath the front seat of a vehicle, and as can be seen in FIG. 7, the batteries are mounted at a slight angle to the horizontal to prevent accumulation of gases between the plates. The three batteries 108, 110 and 112 are connected in series by connector straps 114 and 116 and batteries 120, 122 and 124 are likewise connected by connector straps 126 and 128.

Because of the heat generated during recharging by batteries such as shown in FIG. 6, it may be desirable to cool the batteries at least during recharging. This can be accomplished by using the electrical energy from the exterior source to operate blowers to force air over the outside of the batteries and to thus remove heat from the batteries by convection. Alternatively, refrigerated coils which are resistant to acid can be provided in each battery to remove the heat generated by recharging.

Another way to cool the batteries as shown in FIG. 2, is to cool the air from source 32 by a refrigerator unit 33 before it is forced down line 30 to pump the electrolyte in the batteries attached to line 30. This technique produces a blanket of cold air both above and below the plates and substantially increases the rate at which the batteries can be charged without overheating.

Figure 9:
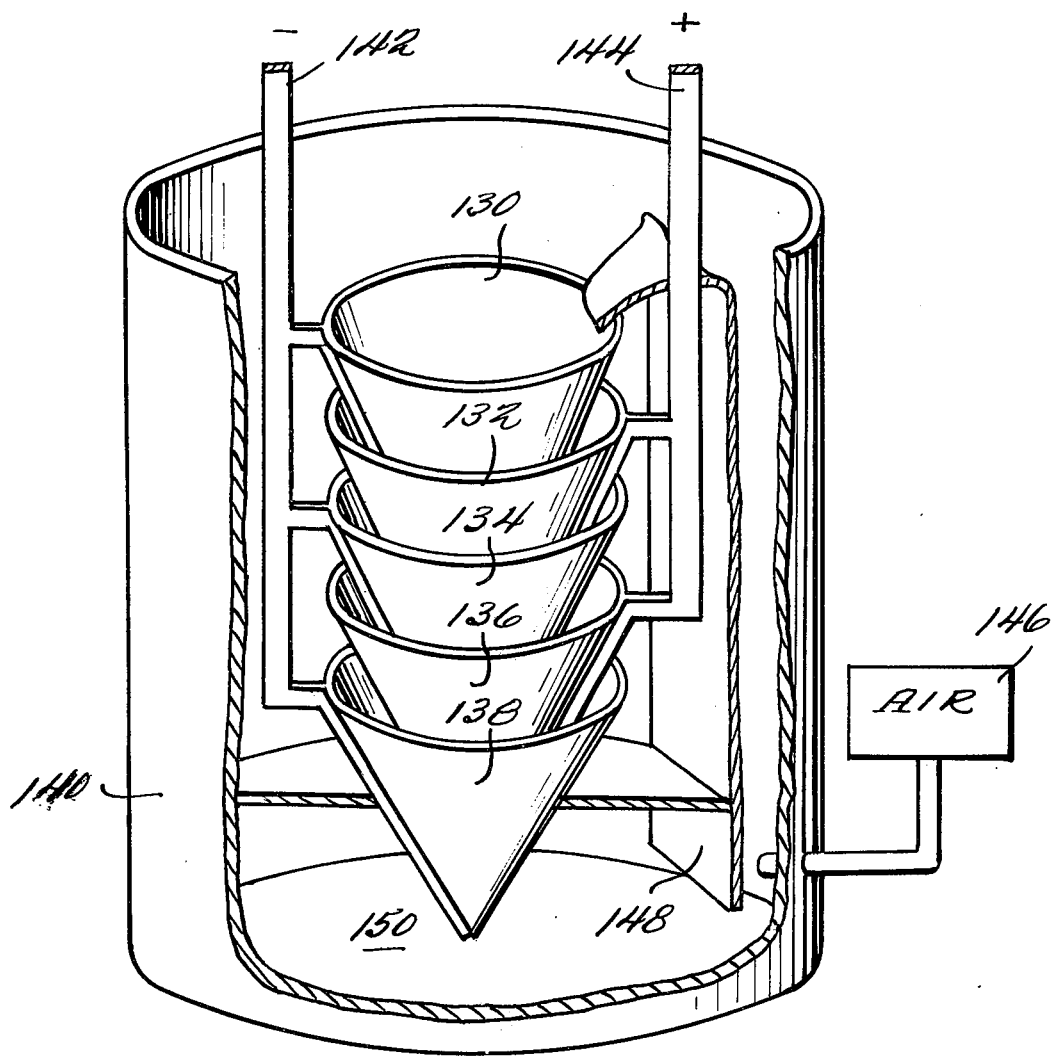
FIG. 9 shows another embodiment of the invention whereby the plates are conically shaped and are stacked so that the electrolyte flows through the stack from top to bottom.

FIG. 9 shows another embodiment of the invention whereby the individual battery plates are conical shaped with an open and closed end. Preferably these plates are constructed of expanded metal as discussed above.

One minor drawback with the embodiment illustrated in FIG. 2 is that a large portion of the electrolyte tends to avoid moving through the horizontal plates by moving around them through the seals provided. Further, as discussed above, gases tend to build up between the horizontal plates and must be periodically eliminated. However, by forming the plates as cones and stacking the cones with their open ends pointing upward, both of these difficulties are substantially resolved. Each cone traps a large amount of liquid which must flow down through it into the next cone. Further evolving gases can rapidly escape from the plates along the slanted sides of the cones.

In the embodiment of FIG. 9, a stack of five cones 130, 132, 134, 136 and 138 is shown mounted within a cylindrical case 140 of any suitable material. It will of course be appreciated that a case of any suitable shape can be employed. The plates in the stack are alternately positive and negative and, of course, suitable insulators separate the plates as in conventional batteries. Each of the conical plates has a bus bar running from its point to the open end as shown and these bars are connected to posts 142 and 144 which extend outside the battery as shown. Any other suitable way of connecting the plates can of course be employed.

As in the embodiment of FIG. 2 electrolyte flows downward through the plates to a reservoir below them from which it is pumped to the top of the stack to again flow through the plates. In this embodiment, however, air from a source of air 146 continually bubbles into the bottom of a confined region between member 148 and casing 140. The bubbling air carries electrolyte from reservoir 150 with it as it moves upward so that the electrolyte so conveyed spills over the top of member 148 into the open end of cone 130. It will of course be appreciated that water can be added to the arrangement shown in FIG. 9 in the same manner as in FIG. 2.

Many changes and modifications in the above described embodiments can be made without departing from the scope of the invention. Accordingly, the invention is intended to be limted only by the appended claims.

What is claimed is:

1. A battery comprising, a plurality of plates mounted substantially horizontally within said battery each comprised of a metallic grid with a paste applied thereto and wherein the thickeness of said grid is 20 thousandths of an inch ±2 thousandths and the thickness of said plate is 23 to 27 thousandths of an inch, a case for containing said plates and an electrolyte and having a region above said plates and a region below said plates so that electrolyte in said region above said plates flows through said plates to said region below said plates, means defining a passage between said upper and lower regions, said passage being separated from the region occupied by said plates including a tube and one way valve means in said tube preventing downward movement of said electrolyte, means for transporting electrolyte in said region below said plates to said region above said plates via said tube including means for introducing air, at least intermittently, into said region below said plates so that said electrolyte moves up said passage into said region above said plates, and means for cooling said air before introduction into said region below the plates.

2. A battery as in claim 1 including a membrane separating said plates from said region below said plates which is permeable to said electrolyte but impermeable to air.

3. A battery as in claim 1 wherein said case is made in a one-piece molded construction of polyethylene.

4. A battery as in claim 1 including means to introduce water into said region above said plates.

5. A battery as in claim 1 including means for venting gases from said region above said plates whenever the pressure in said region above said plates exceeds a predetermined value.

6. A battery as in claim 5 wherein said venting means includes a tank for containing water, tube means connecting said tank to said region above said plates and valve means disposed in said tube means for permitting said gases in said region above said plates to be vented to the atmosphere via the water in said tank when said pressure in said region above said plates exceeds said predetermined value.

* * * * *